Figure 1:
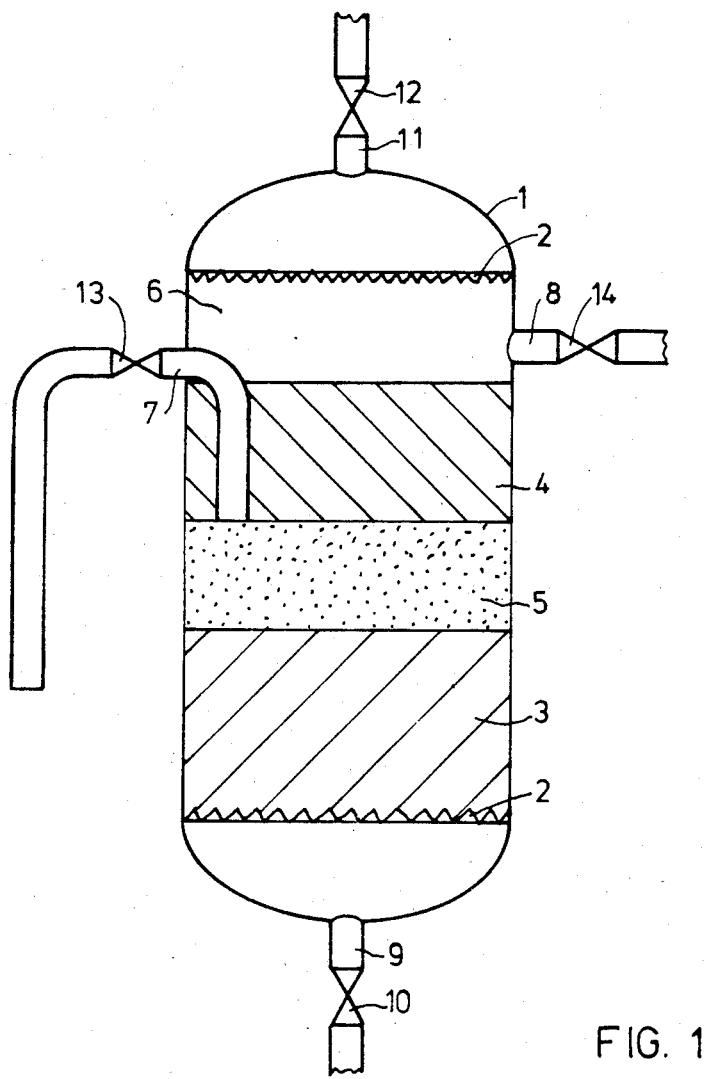

United States Patent [19]

Martinola

[11] Patent Number: 4,645,604
[45] Date of Patent: Feb. 24, 1987

[54] PROCESS AND DEVICE FOR TREATING LIQUIDS WITH CATION EXCHANGERS AND ANION EXCHANGES

[75] Inventor: Friedrich Martinola, Cologne, Fed. Rep. of Germany

[73] Assignee: Bayer Aktiengesellschaft, Leverkusen, Fed. Rep. of Germany

[21] Appl. No.: 743,460

[22] Filed: Jun. 11, 1985

[30] Foreign Application Priority Data

Jun. 20, 1984 [DE] Fed. Rep. of Germany ....... 3422860

[51] Int. Cl.⁴ .............................................. B01J 49/00
[52] U.S. Cl. .................... 210/675; 210/679; 210/685; 210/189; 210/275; 210/290
[58] Field of Search .............. 210/675, 679, 686, 189, 210/268, 269, 275, 290, 685

[56] References Cited
U.S. PATENT DOCUMENTS 3,915,861 10/1975 Marquardt ........................ 210/189
4,264,439 4/1981 Lefevre et al. ..................... 210/675
4,298,696 11/1981 Emmett ............................. 210/675
4,400,278 8/1983 Martinola .......................... 210/290

Primary Examiner—Ivars Cintins
Attorney, Agent, or Firm—Sprung, Horn, Kramer & Woods

[57] ABSTRACT

Upward-flow process for treating liquids in ion exchange filters containing cation exchangers and anion exchangers in separate layers arranged one on top of the other, in which the cation and anion exchangers are separated from one another by a resin layer which does not participate in the ion exchange, the anion exchanger is regenerated externally and the cation exchanger, which remains in the filter, is regenerated in the counter-current and the anion exchanger is removed from and recycled to the filter without whirling up the separating layer and cation exchanger layer. The invention furthermore relates to a new counter-current ion exchange filter for carrying out the process.

10 Claims, 2 Drawing Figures

PROCESS AND DEVICE FOR TREATING LIQUIDS WITH CATION EXCHANGERS AND ANION EXCHANGES

The invention relates to a new process for treating liquids with cation exchangers and anion exchangers and a new device for carrying out the process.

Processes for treating liquids, in particular for the desalination of water or aqueous solutions, for example sugar or glycerol solutions, are known. Combinations of strongly acid cation exchangers with strongly or weakly basic anion exchangers are used for desalination. The various known processes differ in the manner in which the various types of ion exchanger, that is to say cation exchanger and anion exchanger, are arranged.

In mixed bed filters, the cation exchanger and anion exchanger are present in the form of an intimate mixture during the operating phase. For regeneration, the exhausted resin mass is separated into the two components hydraulically on the basis of the different specific gravities of the cation exchanger and anion exchanger. Each of the two layers is regenerated and washed out separately, by itself. Mixed bed filters have the serious disadvantage that the exhausted resin mass cannot be separated completely into cation exchanger and anion exchanger, but that the one type of ion exchanger always still contains certain amounts of the other type of ion exchanger. Regeneration of the cation exchanger and anion exchanger therefore always leads to a certain amount of mis-loaded cation and anion exchanger. The consequences of this mis-loading are unsatisfactory quality of the liquid treated and disproportionately low operating capacities of the mixed bed filters.

In the case of mixed bed filters with internal regeneration, the mis-loading of the cation and anion exchange caused by incomplete separation is accompanied by the unavoidable mis-loading of the ion exchanger situated close to the cation exchanger/anion exchanger interface as a result of penetration of the regenerating agent for one component into the layer of the other component. Although the mis-loading by penetration of the regenerating agent of one component into the layer of the counter-component can be prevented by using separating layer resins, as is recommended, for example, in German Patent Specification No. 971,771 and U.S. Pat. No. 2,666,741, the mis-loading as a result of incorrect separation into cation exchanger and anion exchanger cannot be avoided. The use of the separating layer resins therefore has only a limited value.

Cation and anion exchangers are also very frequently accommodated in separate filters or in separate adjacent chambers of a filter (see, for example, German Offenlegungsschrift No. 2,137,796, U.S. Pat. No. 3,136,719 and 3,719,591 or European Patent No. A 1-0,050,813). The disadvantage of these arrangements is the high expenditure on apparatus and—if the ion exchangers are in separate chambers of a filter—the high pressure loss caused by the valve trays which separate the chambers from one another and the devices required for distribution of the liquid within the chambers.

German Offenlegungsschrift No. 1,642,848 and Japanese Published Application No. JA-B-80/015,259 describe countercurrent processes for desalination of water, in which cation and anion exchangers are arranged in a filter in separate, immediately adjacent layers lying one on top of the other. Because it has a higher specific gravity than the anion exchanger, the cation exchanger forms the lower layer, and the anion exchanger forms the upper layer. During loading, the agent flows through both resin layers in succession. The direction of flow during regeneration is opposite to the direction of flow during loading. Mixing of the two resin layers during upward-flow loading is counteracted by customary measures, for example an auxiliary flow directed onto the surface of the anion exchanger layer or by completely filling the filter with ion exchangers. The two processes differ in the regeneration procedure. According to JA-B-80/015,529, $H_2SO_4$ initially flows through the anion and cation exchangers from the top downwards. The anion exchanger converted into the sulphate form in this manner is converted into the OH form in a second regeneration step by treatment with NaOH, a layer of anion exchanger in the sulphate form remaining between the central drainage accommodated in the anion exchanger and the cation exchanger. In contrast, according to the German Offenlegungsschrift, the anion exchanger and cation exchanger are regenerated separately, the spent regenerating alkali being removed at the central drainage and, at a different point in time, the regenerating acid being introduced at the central drainage.

A serious disadvantage of both processes is that they cannot be carried out without avoiding mis-loading of the ion exchangers and, as a result, also the consequences of mis-loading - inadequate quality of the water treated and low operating capacity of the filter. As a result of the position of the central drainage, determined by the type of process, close to the cation exchanger-/anion exchanger interface, mutual contamination of the one ion exchanger by the regenerating agent of the counter-component is unavoidable, especially in the process according to German Offenlegungsschrift No. 1,642,848. In addition, the unavoidable upward and downward movement of the ion exchanger mass in the filter during starting up of the filter and as a result of the change in volume of the ion exchanger during loading and regeneration leads to mixing of the cation exchanger and anion exchanger at the interface region between the two exchangers.

The process described in German Offenlegungsschrift No. 1,642,848 also has the disadvantage that a complicated filter is required for carrying out the process, in particular a filter which consists of two cylindrical sections of different diameter and which is equipped with devices which prevent rearrangement when the exchanger mass is subjected to upward flow. The process described in No. JA-B-80/015,259 has the particular disadvantage of an exceptionally high consumption of regenerating agent. During acid treatment of the ion exchangers in the first regenerating step, the anion exchanger is completely loaded with $SO_4^{--}$ ions. These $SO_4^{--}$ ions must be displaced again by subsequent treatment with alkali.

It has now been found that a substantially simpler but nevertheless more effective process for treating liquids with cation exchangers and anion exchangers which does not have the disadvantages of the known processes is achieved if the cation and anion exchanger are arranged in separate layers one on top of the other, the cation exchanger being the lower layer and the anion exchanger being the upper layer, in an ion exchange filter customary for counter-current processes with upward-flow loading, the two ion exchangers are separated from one another by an inert resin layer of a certain height which does not participate in the ion exchange, the anion exchanger is removed from the filter for regeneration, without whirling up the cation exchanger and separating layer, the cation exchanger, which remains in the filter, is regenerated in counter-current and the anion exchanger, removed from the filter, is regenerated externally in the usual manner, that is to say in a separate vessel, and the regenerated anion exchanger is recycled again to the working filter for the loading phase, again without whirling up the cation exchanger and separating layer.

The invention thus relates to a process for treating liquids in ion exchange filters which contain the cation exchanger and anion exchanger in separate layers arranged one on top of the other, the cation exchanger being the lower layer and the anion exchanger being the upper layer, and in which the ion exchangers are loaded in an upward flow of liquid and the exhausted ion exchangers are regenerated and washed out separately, which is characterised in that (a) the cation exchanger and anion exchanger are separated from one another by a resin layer of a certain height which does not participate in the ion exchange; (b) when the upward-flow loading has ended, the anion exchanger is removed from the filter, without whirling up the separating layer and cation exchanger, and is regenerated and washed out externally in a known manner in a separate container, and the cation exchanger, which remains in the filter and is covered by the separating layer, is regenerated and washed out in counter-current in a known manner; and (c) after the regeneration of the cation and anion exchanger, the anion exchanger is recycled back to the filter and the anion exchanger layer is built up again, without whirling up the separating layer and cation exchanger layer.

Although the process according to the invention is a counter-current process only in respect of the cation exchanger, being an ion exchange process with external regeneration in respect of the anion exchanger, nevertheless it has been found that with the resin layer sequence claimed: cation exchanger regenerated in counter-current/separating layer of certain height/externally regenerated anion exchanger, a liquid quality is achieved such as is given per se only by pure counter-current processes, that is to say processes in which the cation exchanger and anion exchanger are regenerated in counter-current. In addition, the process according to the invention shows, for regeneration of the cation exchanger, the low regenerating agent requirement characteristic of counter-current processes.

The process according to the invention combines the advantages of the counter-current processes, in which the cation and anion exchangers are accommodated in separate filters or chambers, that is to say the high quality of the treated liquid and low regenerating agent requirement, with the advantages of the ion exchange processes, in which the cation and anion exchangers are accommodated in separate layers, arranged one on top of the other, in one filter and are regenerated in these layers with the various regenerating agents, that is to say simplicity and economy, without displaying the disdvantages of these processes, that is to say higher expenditure on apparatus, unsatisfactory quality of the liquid treated, low operating capacity of the filters and high regenerating agent requirement.

Since the process according to the invention operates without central drainage, the quantitative ratio of cation exchanger to anion exchanger can be changed in the process as desired; consequently, the process has the further advantage over the processes described in German Offenlegungsschrift No. 1,642,848 and in Japanese Application No. B-80/015,259 that it can be very much more easily adapted to the composition of the liquid to be treated. Furthermore, it also does not require additional vessels for backwashing the cation and anion exchanger. The vessel required for external regeneration of the anion exchanger can also be used directly for backwashing the anion exchanger; the cation exchanger is backwashed in the working filter itself.

The separating layer resins which are used for separating layers in mixed bed filters and also the loaded form of the anion exchanger used in the process are suitable as the resin layer which does not participate in the ion exchange and which separates the cation exchanger and anion exchanger from one another. The use of the loaded anion exchanger as the separating layer is preferred; it provides the advantage that (a) no third resin is required, (b) as a result of the greater difference in the specific gravity of cation exchanger/anion exchanger than in the specific gravity of cation exchanger/separating layer resin and separating layer resin/anion exchanger, a sharper separating layer is formed between the cation exchanger and anion exchanger than between the cation exchanger/separating layer resin and separating layer resin/anion exchanger, and (c) the height of the separating layer can be particularly easily adjusted between the individual working cycles by removing a larger or smaller amount of the loaded anion exchanger from the filter for external regeneration.

The resins used as the separating layer resin in the mixed beds are in general bead (co)polymers of styrene, vinyl chloride, methacrylates, divinylbenzene and acrylonitrile, and furthermore acrylonitrile/butadiene/styrene resins, epoxy resins, polyamide resins and polystyrene resins (see European Patent No. A 2-0,010,265, column 1).

So that sharp separating layers are formed between the cation exchanger and separating layer resin on the one hand and the separating layer resin and anion exchanger on the other hand when separating layer resins are used, the separating layer resin should fulfil certain conditions in respect of particle size and specific gravity: the separating layer resin should have about the same particle size as the finest sieve fraction of the cation exchanger. The specific gravity of the separating layer resin should be at least 0.02 g/ml, preferably at least 0.04 g/ml and particularly preferably at least 0.05 g/ml, lower than that of the cation exchanger and at least 0.02 g/ml, preferably at least 0.04 g/ml and particularly preferably at least 0.05 g/ml, higher than that of the anion exchanger.

In the context of the process according to the invention, the finest sieve fraction of the cation exchanger is to be understood as meaning the fraction of the cation exchanger which is obtained as the finest particle size range when the cation exchanger is separated into three different particle size ranges.

The height of the resin layer which does not participate in the ion exchange and separates the cation and anion exchanger from one another (abbreviated below to "separating layer") is of decisive importance for the efficiency of the process according to the invention; in order reliably to avoid mixing of the cation exchanger and anion exchanger, the separating layer must be at least 30 mm, preferably 30 to 90 mm, larger than the height of the free space in the filter at the start of the loading operation, and at least 100 mm high.

In the context of the present invention, the free space of an ion exchange filter is to be understood as the space in the filter chamber which is not filled with ion exchanger; as a result of the change in volume (swelling and shrinkage) of the ion exchangers during loading and regeneration, the free space can both decrease and increase in the course of a working cycle.

The usual, strongly acid cation exchangers based on polystyrene-sulphonic acids crosslinked with divinylbenzene are used as the cation exchanger in the process according to the invention. The particle size of the cation exchanger should be greater than 0.3 mm, advantageously greater than 0.4 mm and preferably greater than 0.45 mm, and its specific gravity should be at least 0.05 g/ml, preferably at least 0.07 g/ml, greater than the specific gravity of the anion exchanger.

The usual, strongly and weakly basic anion exchangers based on polyvinylbenzylamines crosslinked with divinylbenzene or crosslinked N-alkylated poly(meth)acrylamides are used as the anion exchanger in the process according to the invention. The particle size of the anion exchanger should be below 1.20 mm, advantageously below 1.10 mm and preferably below 1.05 mm.

The removal, according to the invention, of the anion exchanger from the working filter without whirling up the separating layer and cation exchanger can be particularly easily effected by hydraulic conveying. Hydraulic conveying of the anion exchanger from the working filter can be effected, for example, by siphoning off the anion exchanger layer by means of one (or more) siphon (or siphons) extending down to the anion exchanger/separating layer interface or with one (or more) ascending tube (ascending tubes) inserted vertically into the anion exchanger down to the anion exchanger/separating layer interface. Recycling of the externally regenerated and washed out anion exchanger into the working filter without whirling up the separating layer and cation exchanger layer which remain in the filter can be achieved, for example, by allowing the anion exchanger to trickle down via a feed line, which discharges into the free space of the filter and is suitable for the transportation of ion exchangers.

The invention therefore also relates to a counter-current filter for carrying out the process claimed. This counter-current filter according to the invention is characterised in that it consists of a one-chamber ion exchange filter which is customary for counter-current processes with upward-flow loading but which is additionally equipped with the following devices: (a) a device with which the anion exchanger layer can be removed from the filter without whirling up the adjacent separating layer and the cation exchanger layer below this; and (b) a device with which the externally regenerated anion exchanger can be recycled back into the filter without whirling up the separating layer and cation exchanger layer remaining in the filter.

1-Chamber ion exchange filters which are usually employed for counter-current processes with loading in upward flow in general consist of a cylindrical vessel which is provided with closable liquid feed and discharge lines and can be closed at the top and bottom with dished boiler ends, the cylindrical interior space of which is closed off at the bottom and top by a device which is permeable to liquid (for example a nozzle tray).

Devices (a) with which an upper ion exchanger layer can be conveyed from an underlying ion exchanger layer out of an ion exchange filter without causing whirling are known. Hydraulic conveying by means of one or more ascending tube(s) has proved particularly suitable. The device (b) consists of a feed line which discharges into the free space of the filter and is suitable for the transportation of ion exchangers.

Figure 2:
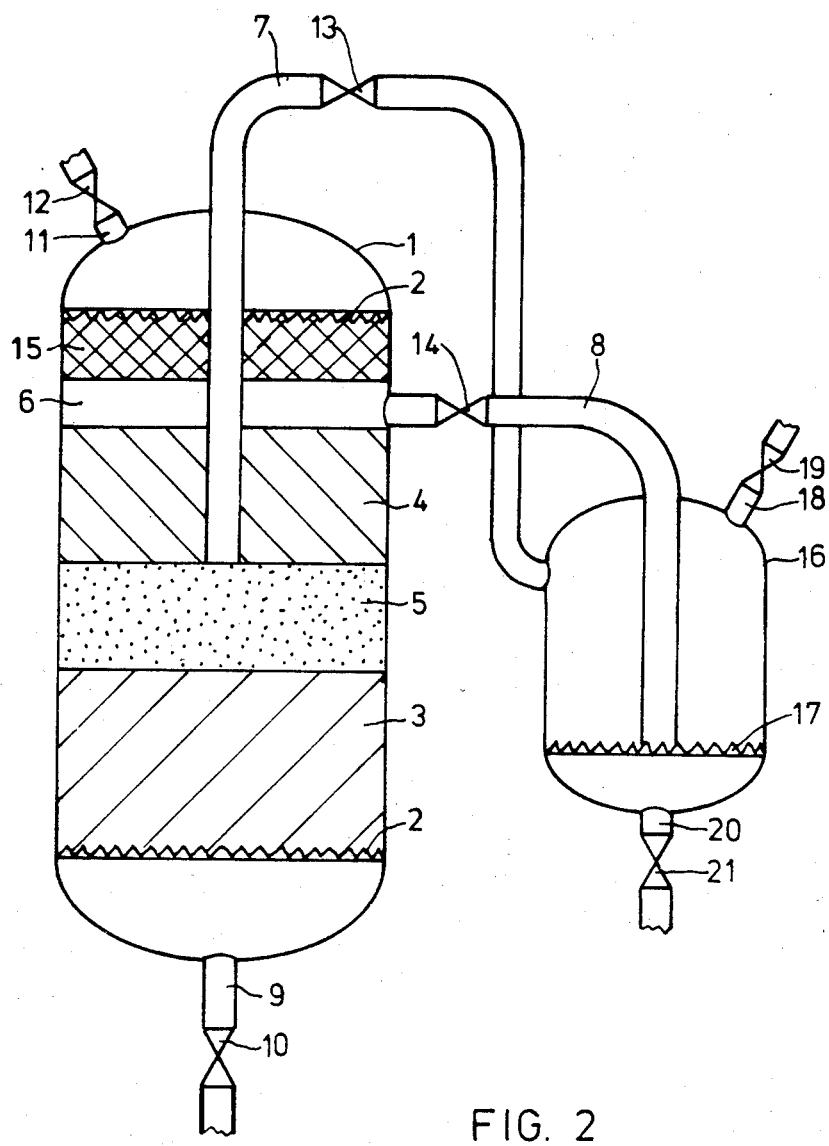

FIGS. 1 and 2 show different embodiments of the invention.

The process according to the invention and the counter-current filter used for carrying it out may be illustrated with the aid of FIG. 1:

The cation exchanger (3), separating layer (5) and anion exchanger (4) rest in separate layers, arranged immediately one on top of the other, on the lower device (2), which is permeable to liquid, of the chamber formed by the cylindrical part of the filter column (1) and the two devices (2) which are permeable to liquid. Above the anion exchanger (4) is the free space (6). The upper device (2), which is permeable to liquid, forms the upper boundary of the free space (6).

In the loading phase, the liquid to be treated enters the filter (1) through the feed line (9). Lines (7) and (8) are closed by the shut-off devices (13) and (14). The treated liquid leaves the filter through line (11). After the loading, the anion exchanger (4) is siphoned off into a second, separate container via line (7), with the shut-off devices (10) and (14) closed and the shutoff device (12) open.

During this hydraulic conveying of the anion exchanger out of the filter (1), no whirling up of the separating layer (5) and cation exchanger (3) occurs.

The anion exchanger (4) is regenerated with dilute aqueous sodium hydroxide solution in the usual manner in a separate container for external regeneration, and is then washed until the washing water runnings from the anion exchanger exhibit only the desired residual conductivity.

During or after regeneration of the anion exchanger (4), the cation exchanger (3), which remains in the working filter (1), is regenerated with dilute aqueous mineral acids, preferably dilute aqueous hydrochloric acid, in the customary manner for counter-current regeneration. The regenerating acid is fed in through line (11), with the shut-off devices (13) and (14) closed, and, after flowing through the separating layer (5) and the cation exchanger layer (3), is removed through line (9). The regenerating acid is washed out of the separating layer and cation exchanger in the same direction of flow as the regeneration.

As soon as the washing water runnings from the cation exchanger (3) display only the desired residual conductivity, the washing operation is ended and the shut-off device (10) is closed.

The anion exchanger (4) is then recycled back into the filter through line (8), with the shut-off devices (10) and (13) closed and the shut-off devices (12) and (14) open. During this recycling, again no whirling up of the separating layer (5) and cation exchanger layer (3) occurs. After the anion exchanger layer (4) has been built up on the separating layer (5), the shut-off device (14) is closed again, shut-off devices (10) and (12) are opened and the loading operation restarts.

A particularly practical embodiment of the process and filter according to the invention is shown in FIG. 2. In this embodiment, the upper device (2), which is permeable to liquid, of the filter (1) is protected from blockages by a floating layer (15) of inert material.

Granules of organic, synthetic materials, for example, of polyethylene or polypropylene, are suitable as the inert material for the floating layer. These inert materials should have a density which is lower than that of the liquids with which they come into contact, that is to say they must float on the liquids which flow through them. The particle size of the granules should advantageously be about 0.2 to 2.0 mm.

The regeneration container (16) required for external regeneration of the anion exchanger is also additionally shown in FIG. 2. When the loading has ended, the anion exchanger (4) is forced into the regeneration container (16) via the ascending tube (7), with shut-off devices (12), (13) and (21) open and shutoff devices (10), (14) and (19) closed. For trouble-free conveying, it is advantageous for the anion exchanger (4) to trickle into the regeneration container from the top, as shown in FIG. 2. As soon as the anion exchanger (4) to be regenerated is in the regeneration container (16), the shut-off device (13) is closed and, with shut-off devices (19) and (21) open, the regenerating alkali is filtered through line (18) over the anion exchanger (4) resting on the device (for example valve tray) (17), which is permeable to liquid, and is removed through line (20). After the regeneration, the anion exchanger is washed out in the same direction of flow. When the washing-out has ended, the shut-off device (21) is closed. The regenerated, washed-out anion exchanger (4) is forced back into the filter (1) hydraulically via line (8), with shut-off devices (12), (14) and (19) open and shut-off devices (10), (13) and (21) closed.

EXAMPLE 1

The filter arrangement described in FIG. 2 is used.

The filter (1) has an internal diameter of 300 mm; its cylindrical height (=chamber height =distance between the bottom and top valve tray (2)) is 2,200 mm. The end of the ascending tube (7) immersed in the anion exchanger layer (4) is in the anion exchanger/separating layer interface. The height of the free space (6) (at the start of loading) is 70 mm, and the height of the floating layer (15) is 200 mm.

The filter (1) is filled with:

70 liters of strongly acid, macroporous cation exchanger height of the cation exchanger layer (3): 1,000 mm;
  specific gravity: 1.21 g/ml;
  particle size: 1.25–0.5 mm
56 liters of strongly basic anion exchanger in gel form height of the anion exchanger layer (4): 800 mm;
  specific gravity: 1.07 g/ml;
  particle size: 1.12–0.4 mm
and
9 liters of separating layer resin (according to European Patent A 2-0,010,265, Example 12) height of the separating layer (5): 130 mm;
  specific gravity: 1.15 g/ml;
  particle size: 0.5–0.7 mm Tap water with the following content of anions and cations (data in meq/l) is used for loading:

| | |
|---|---|
| $Ca^{2+} + Mg^{2+}$ | 5.3 |
| $Na^+ + K^+$ | 3.6 |
| $Cl^- + SO_4^{2-} + NO_3^-$ | 6.4 |
| $HCO_3^-$ | 2.5 |
| $CO_2$ (free) | 0.07 |
| $SiO_2$ | 0.13 |

The regeneration container (16) has an internal diameter of 300 mm and a cylindrical jacket height of 1,600 mm. The distance from the vertical end of line (8) to the bottom valve tray (17) is 50 mm.

After each loading, the cation exchanger is regenerated in counter-current with 10 kg of 30% strength hydrochloric acid (in the form of a 6% strength aqueous solution) and the anion exchanger is regenerated externally with 9 kg of 50% strength sodium hydroxide solution (in the form of a 4% strength aqueous solution).

The water to be desalinated is passed through the filter (1) from the bottom upwards with a flow rate of 1,200 l/hour. The average conductivity of the desalinated water flowing out of the filter (1) is 2 to 3 $\mu S/cm$ and its silicic acid content is less than 0.1 mg of $SiO_2$/l. Loading is interrupted as soon as the conductivity of the desalinated water rises to above 5 $\mu S/cm$. The amount of desalinated water obtained before this interruption value is reached is 4,535 l (average value from six working cycles).

If the ion exchangers are used in the counter-current process described in German Offenlegungsschrift No. 1,642,848 instead of in the process according to the invention, desalinated water with an average conductivity of only 10 $\mu S/cm$ is obtained; the amount of desalinated water obtained before an interruption value of 20 $\mu S/cm$ is reached is only 3,960 liters.

EXAMPLE 2

The procedure followed is as described in Example 1, but the separating layer (5) is built up from 9 l of the strongly basic anion exchanger used, in gel form, and not from 9 l of separating layer resin. These 9 l of anion exchanger are not discharged into the regeneration container (16) after loading, but serve as the separating layer (5) which no longer participates in the ion exchange.

The same results as in Example 1 are obtained with the container filled in this manner. The only difference is that more washing water is required for washing the regenerating acid out of the separating layer +cation exchanger (700 l instead of the 280 l in Example 1).

EXAMPLE 3

The procedure followed is as described in Example 1, except that, for filling the filter (1), a strongly acid cation exchanger in the form of a gel (specific gravity: 1.23 g/ml; particle size: 1.25–0.5 mm) is used as the strongly acid cation exchanger and a strongly basic, macroporous anion exchanger (specific gravity: 1.09 g/ml; particle size: 1.0–0.45 mm) is used as the separating layer (9 l) and as the anion exchanger (56 l).

After each loading, the cation exchanger is regenerated in counter-current with 12 kg of 30% strength hydrochloric acid (in the form of a 6% strength aqueous solution) and the 56 l of anion exchanger are regenerated externally with 9 kg of 50% strength sodium hydroxide solution (in the form of a 4% strength aqueous solution).

The water to be desalinated is passed through the filter (1) from the bottom upwards with a flow rate of 1,400 l/hour. The average conductivity of the desalinated water leaving the filter is 0.6 $\mu S/cm$ and its silicic acid content is 0.05 mg of $SiO_2$/l. Loading is interrupted as soon as the conductivity of the desalinated water rises above 0.6 $\mu S/cm$. The amount of desalinated water which can be obtained before this interruption value is reached is 5,800 l (average value from six working cycles).

EXAMPLE 4

The procedure followed is as in Example 3, except that the separating layer (5) is built up from 9 l of the separating layer resin described in Example 1.

The same results as in Example 3 are obtained with the filter filled in this way. The only difference is that the washing water required for washing the regenerating acid out of the cation exchanger falls from the 650 l required in Example 3 to 210.

EXAMPLE 5

An effluent containing an excess of free acid is used for loading the ion exchangers; in total, the water to be desalinated contains the following amounts (in meq/l) of cations, anions, carbonic acid and silicic acid:

| | |
|---|---|
| Cations | 3.6 |
| $Cl^- + SO_4^{2-} + NO_3^-$ | 5.3 |
| $CO_2 + SiO_2$ | 0.3 |

The filter (1) of the filter arrangement described in FIG. 2 is filled with:
49 liters of the strongly acid, macroporous cation exchanger described in Example 1 height of the cation exchanger layer (3): 700 mm
86 liters of the strongly basic anion exchanger in the form of a gel described in Example 1; of these 86 l, 77 l serve as the anion exchanger; height of the anion exchanger layer (4): 1,100 mm and
    9 l serve as the separating layer;
    height of the separating layer (5): 130 mm The end of the ascending tube (7) immersed in the anion exchanger is in the anion exchanger layer (4) /separating layer (5) interface.

After each loading, the cation exchanger is regenerated in counter-current with 7 kg of 30% strength hydrochloric acid (in the form of a 6% strength aqueous solution) and the 77 l of anion exchanger are regenerated externally with 12.5 kg of 50% strength sodium hydroxide solution (in the form of a 4% strength aqueous solution).

The water to be desalinated is passed through the filter (1) with a flow rate of 1,000 l/hour. The average conductivity of the desalinated water leaving the filter is 5 $\mu$S/cm and its silicic acid content is 0.1 mg of SiO$_2$/l. The amount of desalinated water which can be obtained before the interruption value of 10 $\mu$S/cm is reached is 9,600 l of effluent (average value from six working cycles).

EXAMPLE 6

The ion exchangers are loaded with the water described in Example 1 but without bonding the carbonic acid and silicic acid.

The filter (1) of the filter arrangement described in FIG. 2 is filled in this case with:
80 liters of the strongly acid cation exchanger in the form of a gel described in Example 3 height of the cation exchanger layer (3): 1,150 mm
46 liters of a weakly basic, macroporous anion exchanger based on acrylamide height of the anion exchanger layer (4): 660 mm
    specific gravity: 1.05 g/ml;
    particle size: 1.12–0.3 mm
and
9 liters of the separating layer resin described in Example 1.

The end of the ascending tube (7) immersed in the anion exchanger is in the anion exchanger/separating layer interface.

The cation exchanger is regenerated in counter-current with 16 kg of 30% strength hydrochloric acid (in the form of a 6% strength aqueous solution) and the anion exchanger is regenerated externally with 5.6 kg of 50% strength sodium hydroxide solution (in the form of a 4% strength aqueous solution).

The water to be desalinated is passed through the filter (1) with a flow rate of 950 l/hour. The average conductivity of the desalinated water leaving the filter is 20 $\mu$S/cm, and its content of chloride ions is 2 mg/l. Loading is interrupted as soon as the conductivity of the desalinated water rises above 25 $\mu$S/cm. The amount of desalinated water which can be obtained before this interruption value is reached is 7,550 l (average value from six working cycles).

Since the anion exchanger swells by about 10% by volume during loading, whilst the cation exchanger shrinks by about 5% by volume, a free space (6) of 70 mm is adequate.

What is claimed is:

1. In the process for treating liquids in an ion exchange filter which contains the cation exchanger and anion exchanger in separate layers arranged one on top of the other, the cation exchanger being the lower layer and the anion exchanger being the upper layer, and in which the ion exchangers are loaded in an upward flow of liquid and the exhausted ion exchangers are regenerated and washed out separately, the improvement comprising the following measures:
  (a) separating the cation exchanger and anion exchanger from one another by a resin layer which does not participate in the ion exchange; the height of this layer being at least 30 mm greater than the height of the free space in the filter at the start of the loading operation, and being at least 100 mm;
  (b) when the upward-flow loading has ended, removing the anion exchanger from the filter, without whirling up the separating layer and cation exchanger, regenerating and washing out the anion exchanger externally in a separate container, and regenerating and washing out in counter-current the cation exchanger which remains in the filter and is covered by the separating layer; and
  (c) after the regeneration of the cation exchanger and anion exchanger, recycling the anion exchanger to the filter thereby again building up the anion exchanger layer without whirling up the separating layer and cation exchanger layer.

2. The process of claim 1, wherein the resin layer which does not participate in the ion exchange and separates the cation exchanger and anion exchanger from one another is formed from loaded anion exchanger.

3. The process of claim 1, wherein the resin of the separating layer has about the same particle size as the finest sieve fraction of the cation exchanger, and its specific gravity is at least 0.02 g/ml lower than the specific gravity of the cation exchanger and at least 0.02 g/ml higher than the specific gravity of the anion exchanger.

4. The process of claim 1, wherein the particle size of the cation exchanger is greater than 0.3 mm and its specific gravity is at least 0.05 g/ml greater than the specific gravity of the anion exchanger, and the particle size of the anion exchanger is less than 1.20 mm.

5. The process of claim 1, wherein the resin layer which does not participate in the ion exchange and separates the cation exchanger and anion exchanger from one another is formed of inert resin.

6. In a counter-current ion exchange filter for treating liquids and comprising a housing, a line for flow of liquid at the bottom of the housing, a line for the flow of liquid at the top of the housing, means for individually opening and closing said bottom line and said top line, a cation exhanger resin in the bottom of said housing, and an anion exchanger resin in the top of said housing, the top of anion exchanger terminating below the top line and defining a free space in which the anion exchanger resin may expand, the improvement which comprises:

(a) a separating resin layer between the cation exchanger resin and the anion exchanger resin, the height of this layer being at least 30 mm greater than the height of the free space in the filter at the start of the loading operation, and is at least 100 mm;

(b) means for removing the anion exchange layer from the housing without whirling up the adjacent separating layer and the cation exchanger layer therebelow; and (c) means for recycling to the housing externally regenerated anion exchanger without whirling up the separating layer and cation exchanger layer remaining in the housing.

7. A filter according to claim 6, including a lower liquid permeable support adjacent the bottom of the housing and on which the cation exchanger resin is located, and an upper liquid permeable support above the anion exchanger resin and defining the top of the free space.

8. A filter according to claim 6, wherein the removing means in (b) comprises at least one siphon having a leg which extends down to the anion exchanger/separating layer interface.

9. A filter according to claim 6, wherein the removing means in (b) comprises at least one ascending tube inserted vertically into the anion exchanger down to the anion exhanger/separating layer interface.

10. A filter according to claim 6, wherein the recycling means in (c) comprises a feed line which discharges into the free space of the filter and is suitable for the transportation of ion exchangers.

* * * * *